(12) United States Patent
Conway

(10) Patent No.: US 9,096,449 B1
(45) Date of Patent: Aug. 4, 2015

(54) METHOD FOR TREATING FLOWBACK WATER FROM HYDRAULIC FRACTURING

(71) Applicant: Bryce Conway, Weatherford, OK (US)

(72) Inventor: Bryce Conway, Weatherford, OK (US)

(73) Assignee: Flex-Chem, LLC, Weatherford, OK (US)

( * ) Notice: Subject to any disclaimer, the term of this patent is extended or adjusted under 35 U.S.C. 154(b) by 65 days.

(21) Appl. No.: 13/901,358

(22) Filed: May 23, 2013

Related U.S. Application Data

(60) Provisional application No. 61/650,728, filed on May 23, 2012.

(51) Int. Cl.
*C02F 3/34* (2006.01)
*C02F 3/28* (2006.01)
*C02F 3/30* (2006.01)

(52) U.S. Cl.
CPC ... *C02F 3/34* (2013.01); *C02F 3/28* (2013.01); *C02F 3/301* (2013.01)

(58) Field of Classification Search
USPC .............. 210/610–611, 620; 435/252, 262.5
See application file for complete search history.

(56) References Cited

U.S. PATENT DOCUMENTS

| | | | | |
|---|---|---|---|---|
| 6,630,067 | B2 * | 10/2003 | Shieh et al. | 210/139 |
| 7,527,736 | B2 * | 5/2009 | Shafer et al. | 210/620 |
| 8,784,660 | B2 * | 7/2014 | Jones et al. | 210/615 |

* cited by examiner

*Primary Examiner* — Chester Barry
(74) *Attorney, Agent, or Firm* — Hall Estill Law Firm

(57) ABSTRACT

Composition and method for treating fluids with select facultative organisms and/or nutrients. At least one facultative organism is selected and added to a fluid to stimulate/facilitate biological remediation of the fluid. In one embodiment, the select facultative organisms are put into frac pits/ponds containing frac water to inhibit the sulfate reducing bacteria in the frac water. In another embodiment, at least one facultative organism and nutrients are selected and added to a fluid.

13 Claims, 2 Drawing Sheets

METHOD FOR TREATING FLOWBACK WATER FROM HYDRAULIC FRACTURING

CROSS-REFERENCE TO RELATED APPLICATIONS

The present application claims the benefit under 35 U.S.C. §119(e) of U.S. Provisional application Ser. No. 61/650,728, filed May 23, 2012, entitled "COMPOSITION FOR TREATING FLUID AND METHODS OF MAKING AND USING SAME", which is hereby expressly incorporated herein in its entirety.

BACKGROUND

The present disclosure relates generally to a composition for treating fluid and methods of making and using same, and more particularly, but not by way of limitation, to a composition and method for fluid treatment by adding facultative microorganisms and/or nutrients to the fluid.

Microbes have been used to treat water for years (sewage, mosquitoes, pesticides, etc.). Typically, aerobic bacteria are used for waste water treatment to break down contaminants. Aerobic organisms are used in aerobic ponds and anaerobic bacteria are used in digesters.

However, microbes have not typically been utilized in the treatment of all types of fluids. For example, the development of tight gas resources commonly involves hydraulic fracture stimulation with large volumes of water-based fluids. The fluids that flow back to the surface ("frac water", flowback water, flowback fluids) commonly contain contaminants such as frac fluid chemicals/additives (i.e., polymers, surfactants, friction reducers, non-emulsifiers, permeability modifiers, scale inhibitors, biocides, dissolved salts, etc.), residual hydrocarbons and organics, various ions, dissolved organics (gasoline/diesel-range organics, methanol, glycols, residues), dissolved and suspended solids (sand, silt, iron sulfide) and undesirable bacteria that must be decreased or removed so the water can be recycled/reused in further field development, or disposed. There are numerous water treatment methods that can be used for cleaning up frac water, and many of the methods involve use of tanks or pits such as holding tanks, settling pits and/or oxidation ponds for removal of contaminants.

To this end, although microbes are used to treat water, there is a need for the use of facultative anaerobes in the remediation of frac water and further improvements are desirable to enhance the use of such bacteria in the treatment of other fluids. It is to such a composition(s) and methods of making and using such composition(s) that the present disclosure is directed.

SUMMARY

Various embodiments disclosed herein are generally directed to compositions and methods of using facultative anaerobes in the remediation of frac water and other fluids.

In accordance with some embodiments, a method for treating flowback water from hydraulic fracturing or other fluid from some other process. At least one facultative organism is selected. The facultative organism is at least one of *Acinetobacter* sp., *Alcaligenes* sp., *Bacillus* sp., *Brevibacillus* sp., *Campylobacter* sp., *Corynebacterium* sp., *Flavobacterium* sp., *Halomonas* sp., *Marinobacter* sp., *Micrococcus* sp., *Pantoea* sp., *Paracoccus* sp., *Pseudomonas* sp., *Rhodobacter* sp., *Serratia* sp., *Shewanella* sp., *Sphingomonas* sp., *Stenotrophomonas* sp., or *Thiobacillus* sp. The facultative organism is *Pseudomonas balearica*, *Pseudomonas fluorescens*, *Pseudomonas stutzeri*, *Stenotrophomonas maltophilia*, or any combination(s) thereof. The at least one facultative organism is introduced into the flowback water from hydraulic fracturing to reduce sulfate reducing bacteria or into various other fluids of various other processes. The at least one facultative organism is introduced to a frac pond. A metabolic inhibitor for inhibiting sulfate reducing bacteria is introduced to the flowback water. In some embodiments, the metabolic inhibitor is molybdate. Nitrate is introduced for increasing the redox potential of the flowback water. The at least one facultative organism is added to the flowback water or fluid at a concentration between 100 ppm and 2,000 ppm. In other embodiments, the at least one facultative organism is added to the flowback water or fluid at a concentration between 20 ppm and 20,000 ppm. A nutrient composition is introduced having a blend of carbohydrates to the flowback water or fluid. The blend of carbohydrates comprises cellulose, lignocelluloses and xanthan. 650 ppm of at least one facultative organism is mixed with 2% of a liquid nutrient. Oxygen is introduced into the flowback water. An aerator is provided for introducing oxygen into the flowback water.

In some embodiments, a composition includes at least one facultative anaerobe for introduction into flowback water from hydraulic fracturing, wherein the facultative anaerobe is *Acinetobacter* sp., *Alcaligenes* sp., *Bacillus* sp., *Brevibacillus* sp., *Campylobacter* sp., *Corynebacterium* sp., *Flavobacterium* sp., *Halomonas* sp., *Marinobacter* sp., *Micrococcus* sp., *Pantoea* sp., *Paracoccus* sp., *Pseudomonas* sp., *Rhodobacter* sp., *Serratia* sp., *Shewanella* sp., *Sphingomonas* sp., *Stenotrophomonas* sp., or *Thiobacillus* sp. The facultative anaerobe is *Pseudomonas balearica*, *Pseudomonas fluorescens*, *Pseudomonas stutzeri*, *Stenotrophomonas maltophilia*, or combinations thereof. The composition includes $1.6 \times 10^6$ *Pseudomonas balearica*, $1.6 \times 10^6$ *Pseudomonas fluorescens*, $1.6 \times 10^6$ *Pseudomonas stutzeri* and $1.6 \times 10^6$ *Stenotrophomonas maltophilia*. A nutrient composition having a blend of carbohydrates is included. The blend of carbohydrates includes cellulose, lignocelluloses and xanthan. 650 ppm of at least one facultative anaerobe is mixed with 2% of a liquid nutrient.

These and other features and advantages which may characterize various embodiments can be understood in view of the following detailed discussion.

DETAILED DESCRIPTION

Figure 1:
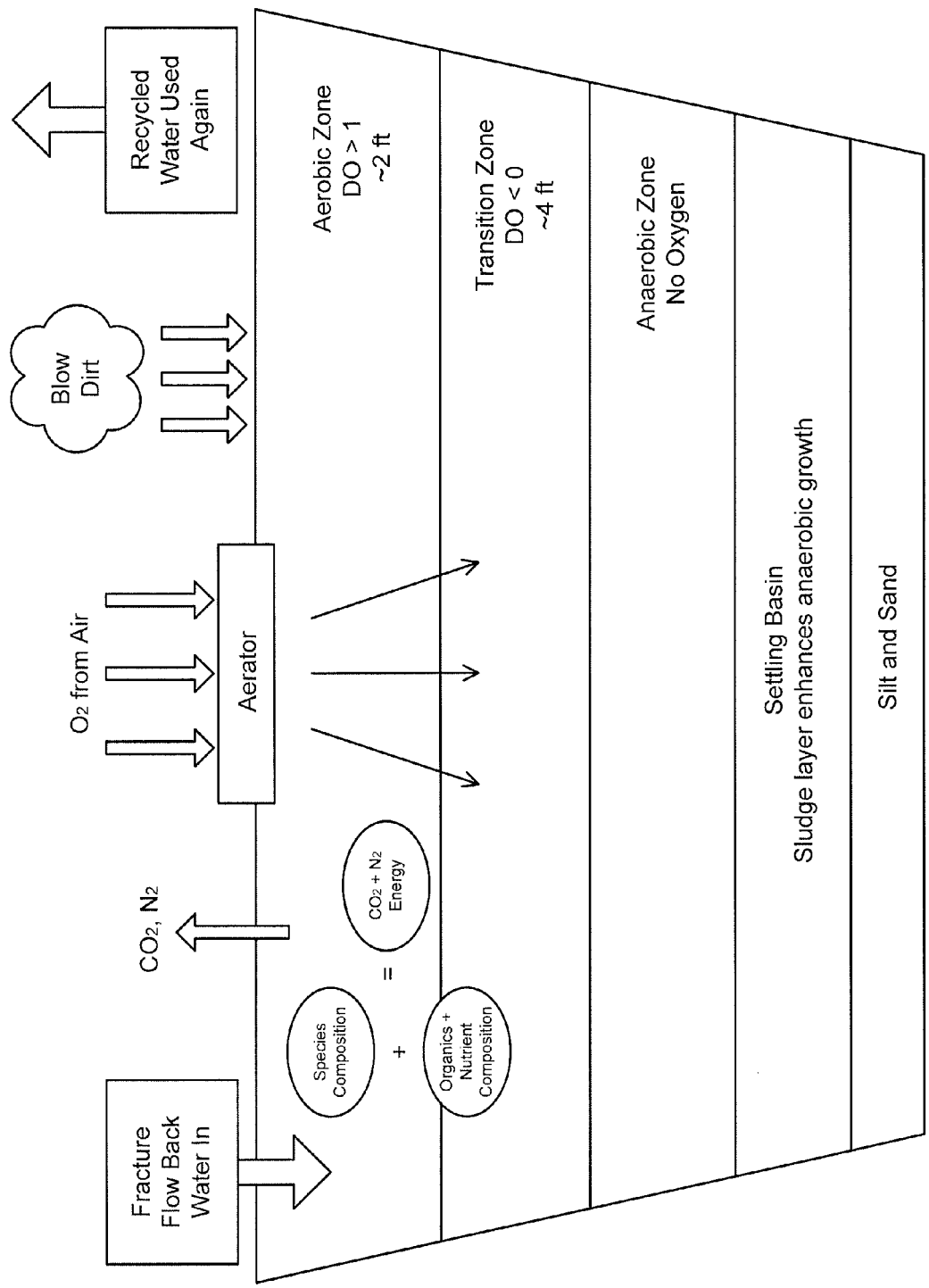
FIG. 1 is a representation of one embodiment of a method for treating flowback water from hydraulic fracture stimulation in accordance with the present disclosure.

One embodiment of the present disclosure is directed to a biological treatment method for remediating flowback water from frac treatments for reuse in hydraulic fracturing and/or disposal. In one embodiment, select facultative microorganisms and/or nutrients are added into the hydraulic frac water to stimulate/facilitate biological remediation of the water through various means. In one embodiment, the select facultative organisms and/or nutrients are put into frac pits/ponds. However, it should be understood that the microorganisms and/or nutrients can be introduced into the water at any point—the pit, holding tanks, pipeline, or in-ground pond (pre- or post-fracturing)—wherever water is being moved/stored. The treatment can be used to remove organic contaminants, decrease toxicity, facilitate reduction in the solids and decrease the numbers and/or activity of undesirable bacteria.

Bacteria such as sulfate reducing bacteria (SRB), general aerobic bacteria (GAB), acid producing bacteria (APB), nitrate reducing bacteria (NRB), slime-forming bacteria (SFB), are commonly present in the frac water; they may be naturally-occurring in the formation, or intentionally or unintentionally introduced at any stage during the frac operation or flowback. When bacteria find an environment that is favorable, they can become active and cause affects that are either desirable or undesirable, depending on the type of bacteria and the makeup of the water. For example, SRB are an undesirable type of bacteria well-known to the oil industry that can thrive in anaerobic environments and produce hydrogen sulfide ($H_2S$).

Biological oxygen demand (BOD) and chemical oxygen demand (COD) are measurements of the amount of oxidizable organic material in water. In water treatment, the prevailing conditions will determine which processes occur and which are suppressed. Aerobic biological oxidation is commonly a desirable treatment method to break down organic contaminants. However, if there is high BOD/COD, aerobic bacteria can rapidly consume available oxygen and cause the system to become anaerobic, which can unintentionally stimulate undesirable bacteria such as SRB.

Facultative organisms, or facultative anaerobes, are able to break down contaminants in both aerobic and anaerobic conditions. One embodiment of the present disclosure involves the use of facultative anaerobes at any stage of the water treatment process to remediate frac water. The remediation can be achieved by breaking down organic contaminants, decreasing BOD/COD, decreasing total suspended solids (TSS), and/or preventing or decreasing the production of $H_2S$. Facultative organisms can be added to the water, and/or stimulated by addition of specific nutrients that stimulate facultative organisms to grow or compete with anaerobic bacteria for nutrients. The stimulation and growth of facultative organisms can be used to inhibit the growth of SRB/APB. This deprives the SRB/APB of its ability to grow and create undesirable sulfides.

The facultative organisms may include, but are not limited to, *Acinetobacter* sp., *Alcaligenes* sp., *Bacillus* sp., *Brevibacillus* sp., *Campylobacter* sp., *Corynebacterium* sp., *Flavobacterium* sp., *Halomonas* sp., *Marinobacter* sp., *Micrococcus* sp., *Pantoea* sp., *Paracoccus* sp., *Pseudomonas* sp., *Rhodobacter* sp., *Serratia* sp., *Shewanella* sp., *Sphingomonas* sp., *Stenotrophomonas* sp., and *Thiobacillus* sp. In one embodiment, a composition includes $1.6 \times 10^6$ *Pseudomonas balearica*, $1.6 \times 10^6$ *Pseudomonas fluorescens*, $1.6 \times 10^6$ *Pseudomonas stutzeri* and $1.6 \times 10^6$ *Stenotrophomonas maltophilia*, or any combination(s) thereof. It should be understood that various amounts of facultative organisms may be used depending on the amount of fluid to be treated. It should also be understood that any facultative organism may be utilized in the treatment of fluid, alone or in combination with another organism(s) and/or nutrient(s). Further, it should be understood by one of ordinary skill in the art that any facultative organism(s) may be utilized in one embodiment of the present disclosure, so long as the facultative organism(s) function(s) in accordance with one embodiment of the present disclosure as described herein.

The nutrients may include, but are not limited to, carbon compounds such as carbohydrates, fatty acids, and proteins; nitrogen compounds such as ammonia/ammonium, nitrate, nitrite, urea; sulfur compounds such as sulfates, sulfides, thiosulfates and sulfoxides; phosphates and micronutrients such as magnesium, iron, copper, zinc, cobalt, molybdenum and/or boron. It should be understood that any nutrient may be utilized in the treatment of fluid as described herein, alone or in combination, with another nutrient(s) and/or organism(s). Thus, it should be understood by one of ordinary skill in the art that any nutrient(s) may be utilized in one embodiment of the present disclosure, so long as the nutrient(s) functions in accordance with one embodiment of the present disclosure as described herein.

In some embodiments, some nutrients could be left out, for example; carbon compounds, reduced nitrogen such as ammonia/ammonium or urea, sulfur compounds, phosphates and micronutrients could be eliminated.

Adding new organisms and/or nutrients introduces new metabolic pathways and natural microbiological competition into the frac water treatment system to shift the process to a more desirable treatment.

The flowback fluids contain substantial amounts of biologically-degradable organic material, which creates a high BOD and the oxygen can be quickly consumed by the aerobes. SRB are widespread in oilfield fluid systems, but their activity is minimal if oxygen is present. When the oxygen is depleted and the system becomes anaerobic, if sulfate is present (sulfate is present in sea water and many other surface waters), the SRB will become active and degrade the organic material anaerobically, producing $H_2S$ as a byproduct.

Facultative organisms are commonly present in low numbers in the frac water system, but the facultative organisms seldom dominate enough to prevent the system from becoming anaerobic. Also, many facultative organisms use nitrate, which is commonly in low concentration and insufficient to stimulate high activity by the facultative organisms.

In one embodiment of the present disclosure, facultative organisms and/or nutrients are introduced to stimulate activity of facultative organisms, whether they are the added organisms, or those that were previously present in the frac water system. Addition of higher numbers of degradative organisms accelerates the degradation. Addition of metabolic capabilities that may not be present in native populations increases the degradation. The facultative organisms are able to break down some of the organic material without the use of oxygen, thereby decreasing the likelihood that the system will become anaerobic. The nutrient package stimulates the facultative organisms, but not all nutrients may be provided, which causes some nutrients to become limiting. Since the nutrient package favors the growth of facultative organisms, the facultative organisms are able to compete more effectively than the SRB for the limiting nutrients, thereby depriving the SRB of nutrients by competition.

In one example of one embodiment, facultative organisms are added to a frac fluid at a concentration between 100 ppm and 2,000 ppm. In another example, addition of the facultative organisms may be between 20 ppm and 20,000 ppm, depending on how much fluid treatment is needed. It should be understood that any number of organisms may be introduced to the fluid, so long as the method functions in accordance with the present disclosure as disclosed herein. That is, the process may work with lower numbers of organisms than in the fluid, but at a slower rate.

One aspect of one embodiment of the present disclosure is that the introduction of organisms have metabolic capabilities to grow without oxygen. Although facultative organisms are known, oxygen-tolerant anaerobic degrading organisms may be used in one embodiment of the present disclosure.

Another aspect of one embodiment of the present disclosure is the stimulation of favorable organisms to outcompete the SRB for nutrients. In one embodiment of the present disclosure, anything that inhibits SRB, such as a metabolic inhibitor (molybdate), or increases the redox potential (nitrate), may be used.

In one embodiment of the present disclosure, organisms may be changed/substituted as long as the metabolic capabilities are maintained. Also, in one embodiment of the present disclosure, the function of one bacteria may be taken over by another bacteria as long as metabolic function carries on. However, the conditions of a system may not be suitable. For example, an aerobic bacteria may degrade contaminants in the presence of oxygen, like one embodiment of the present disclosure, but the aerobic bacteria cannot degrade contaminants without oxygen.

In another embodiment of the present disclosure, non-toxic surfactants may be utilized in fluids that contain non-aqueous phase contaminants (i.e., hydrocarbons in an oil phase, not dissolved).

The methods of bioremediation disclosed herein are combinations of biologicals and biochemicals used to remove iron sulfide and lower organic loadings in recycled/produced frac water. In one embodiment, this is accomplished via adding a composition to a frac pond. In another embodiment, various nutrient formulations reduce the ability of SRB to grow and induce the production of $H_2S$.

Dosage recommendations of various embodiments of compositions vary based on the design and volume requirements of the system to be treated.

Benefits of the various compositions/methods as disclosed herein:
  reduction of SRB/APB;
  biosurfactant production reduces fracturing injection pressures;
  $H_2S$ reduction;
  remediates iron sulfide;
  decreases amount of disposed water;
  separate and keep more oil;
  lower biocide cost;
  environmentally safe;
  does not interfere with HPG or CMHPG guar gel systems;
  does not interfere with borate or zirconate crosslinkers;
  does not interfere with AP or SP oxidizer breakers; and
  cost-effective.

Referring to FIG. 1, in accordance with the present disclosure as described herein, the present method is shown changing the equilibrium of the frac pit to control SRB growth. Many chemical service companies treat frac pits with biocides for SRB control. Biocide treatments shift the equilibrium temporarily, but over time, the equilibrium shifts right back to where it started. The present method permanently shifts the equilibrium of the frac pit by remediating the COD's (oxidizable organics or "bacteria food") which slows down SRB growth because their food is now gone. By removing the COD's, a chain reaction occurs. SRB growth is significantly deterred. Fewer SRB's result in lowered $H_2S$. Lower $H_2S$ results in less iron being converted to iron sulfide. Iron sulfide is a solid black precipitate which wreaks havoc in frac water by plugging up the formation being fracked and causing a loss of permeability, known in the industry as "laying iron on the formation".

The method utilizes halophilic (salt-loving) facultative anaerobic species for the removal of COD in brine formation water stored in "frac pits" to starve out existing SRB in frac pits for the ultimate result of pre-conditioning frac pit water to use less biocide during the frac job because there are now less SRB's after the method of biologic treatment. The present method utilizes the composition of facultative anaerobes. The composition works in the top aerobic part of the pit and the lower anaerobic part of the pit. In one embodiment, in the lower anaerobic part of the pit, the composition containing species utilizes the nitrate present in a nutrient composition to respirate.

In another embodiment, aerators are installed in frac pits being treated with the present method to provide more oxygen. The bacteria species in the composition are more efficient with oxygen than without, but work either way. The present method utilizes select facultative anaerobic species for the remediation of COD's in frac pit environments where the conditions are simultaneously aerobic and anaerobic for the control of SRB and APB.

It should be understood that one embodiment of the present disclosure may be utilized in the treatment of other fluids, such as wastewater, food processing water, any water that has high BOD/COD, etc.

In order to further illustrate the present disclosure, the following examples are given. However, it is to be understood that the examples are for illustrative purposes only and are not to be construed as limiting the scope of the subject disclosure.

EXAMPLES

Example 1

In one embodiment, the composition is a liquid non-ionic biological formulation containing living facultative anaerobic species (*pseudomonas balearica, pseudomonas fluorescens, pseudomonas stutzeri* and *stenotrophomonas maltophilia*). The composition includes $1.6 \times 10^6$ *Pseudomonas balearica*, $1.6 \times 10^6$ *Pseudomonas fluorescens*, $1.6 \times 10^6$ *Pseudomonas stutzeri* and $1.6 \times 10^6$ *Stenotrophomonas maltophilia*. The species are selected for their heavy biosurfactant production, halophilic and excellent water wetting properties. The composition's non-ionic character makes it an extremely versatile additive, finding a wide variety of applications. The composition imparts improved penetrating properties to frac water and helps prevent formation water blocks by reducing surface and interfacial tension. Water injection rates are improved and oil is removed from solid surfaces through it's biosurfactant production. The composition also demonstrates beneficial non-emulsifying properties and is proven to significantly lower scaling tendencies.

Properties
Physical State: Liquid Specific Gravity: 1.0262
Freeze Point: 24° F. pH: 6.5-7.6
Density: 8.51 lbs/gal
Chemical Type: Liquid Biological Media Viscosity: 1.25 cps @ 60° F.

In one embodiment, the composition is injected directly into surface frac water ponds. However, it should be understood that the composition may be introduced at any point, such as frac pit, holding tanks, pipeline, or in-ground pond (pre- or post-fracturing). In one embodiment, the dosage concentration is about 650 ppm mixed with 2% of a liquid nutrient. When used in tank cleaning applications, the effective dosage range is 2,500 ppm-5,000 ppm. The composition is compatible with all frac fluids and refinery catalysts, but is not compatible with acid solutions.

Example 2

In another embodiment, the composition is a liquid balanced media formulation providing and promoting the absorption of carbohydrates, casamino acids and blended inorganic materials for optimum nutrient cycling of facultative anaerobic bacteria used in downhole well and other applications. A blend of residual carbohydrates (cellulose, lingocellulose, xanthan) are included for metabolic utilization and increased biosurfactant production. Residual carbohydrates are translocated to metabolic sites improving metabolic performance in anaerobic conditions.

Analysis
Carbohydrates 35.0%
Total Nitrogen (N) 6.0%
0.76% Ammoniacal Nitrogen
1.24% Nitrate Nitrogen
4.0% Urea Nitrogen
Available Phosphate ($P_2O_5$) 4.0%
Soluble Potash ($K_2O$) 4.0%
Chelated Iron (Fe)
Chelated Manganese (Mn) 0.05%
Chelated Zinc (Zn) 0.05%
Boron (B) 0.005%
Derived from: Urea, Ammonium Phosphate, Potassium Nitrate, Phosphoric Acid, Potassium Phosphate, Boric Acid, Magnesium, Iron, Zinc, Manganese and Copper Glucoheptonates.

In one embodiment, the composition is used in facultative anaerobic microbial product blends up to 6%. In one embodiment, the treating range is 1%-2%. Stimulation treatments may require 8-12 gal/Mgal of fluid to be treated.

Example 3

Figure 2:
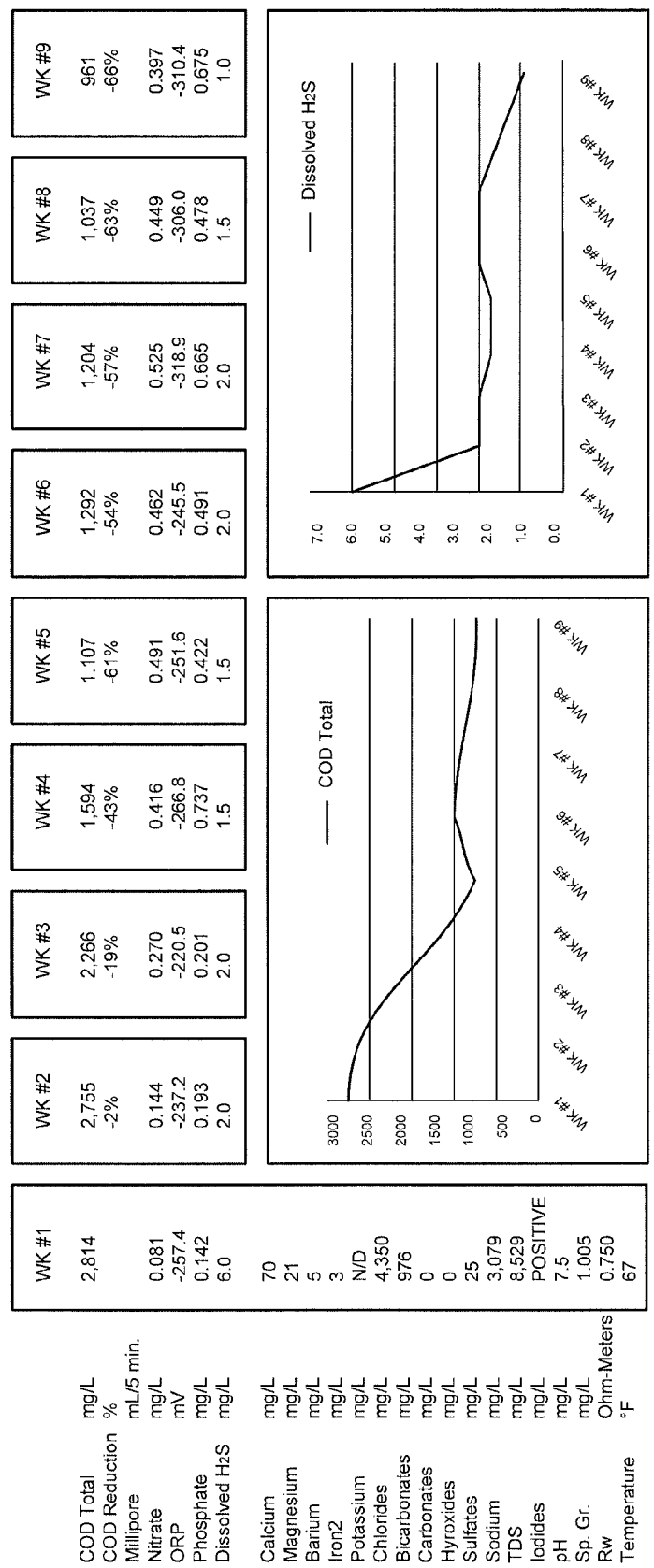
FIG. 2 is a graphical representation of changes from one embodiment of a method of treating flowback water in accordance with the present disclosure.

FIG. 2 shows data from a 500,000 bbl. frac pit treated with the compositions of Example 1 and Example 2. The total COD before the compositions are introduced to the frac pit was 2,814 mg/L and the dissolved $H_2S$ was 6.0 mg/L. The COD and $H_2S$ both decrease over time after addition of the compositions.

From the present description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A method for treating flowback water from hydraulic fracturing, comprising:
   selecting at least one facultative organism;
   introducing the selected at least one facultative organism into the flowback water from hydraulic fracturing to reduce sulfate reducing bacteria; and
   adding nitrate for increasing the redox potential of the flowback water.

2. The method of claim 1, wherein the facultative organism is *Acinetobacter* sp., *Alcaligenes* sp., *Bacillus* sp., Brevibacillus sp., *Campylobacter* sp., *Corynebacterium* sp., *Flavobacterium* sp., *Halomonas* sp., *Marinobacter* sp., *Micrococcus* sp., *Pantoea* sp., Paracoccus sp., *Pseudomonas* sp., *Rhodobacter* sp., *Serratia* sp., *Shewanella* sp., *Sphingomonas* sp., *Stenotrophomonas* sp., or *Thiobacillus* sp.

3. The method of claim 1, wherein the facultative organism is *Pseudomonas balearica, Pseudomonas fluorescens, Pseudomonas stutzeri, Stenotrophomonas maltophilia*, or combinations thereof.

4. The method of claim 1, wherein the at least one facultative organism is introduced to a frac pond.

5. A method for treating flowback water from hydraulic fracturing, comprising:
   selecting at least one facultative organism;
   introducing the selected at least one facultative organism into the flowback water from hydraulic fracturing to reduce sulfate reducing bacteria; and
   introducing a metabolic inhibitor for inhibiting sulfate reducing bacteria to the flowback water.

6. The method of claim 5, wherein the metabolic inhibitor is molybdate.

7. The method of claim 1, wherein the at least one facultative organism is added to the flowback water at a concentration between 100 ppm and 2,000 ppm.

8. The method of claim 1, wherein the at least one facultative organism is added to the flowback water at a concentration between 20 ppm and 20,000 ppm.

9. The method of claim 1 further comprising:
   adding a nutrient composition having a blend of carbohydrates to the flowback water.

10. The method of claim 9, wherein the blend of carbohydrates comprises cellulose, lignocelluloses and xanthan.

11. The method of claim 1, wherein 650 ppm of at least one facultative organism is mixed with 2% of a liquid nutrient.

12. The method of claim 1, further comprising:
   introducing oxygen into the flowback water.

13. The method of claim 1, further comprising:
   providing an aerator for introducing oxygen into the flowback water.

* * * * *